United States Patent [19]
Dickinson et al.

[11] 3,820,867
[45] June 28, 1974

[54] SEGMENTED RETAINING RINGS FOR ANTIFRICTION BALL BEARINGS

[75] Inventors: Thorn W. Dickinson, Berlin; Chester Gronski, Newington, both of Conn.

[73] Assignee: Textron, Inc., Providence, R.I.

[22] Filed: Dec. 29, 1972

[21] Appl. No.: 319,560

[52] U.S. Cl. .............................................. 308/201
[51] Int. Cl. ............................................ F16c 33/38
[58] Field of Search .................................... 308/201

[56] References Cited
UNITED STATES PATENTS
1,241,669  10/1917  Schneider .......................... 308/201
FOREIGN PATENTS OR APPLICATIONS
349,454  11/1960  Switzerland ......................... 308/201
530,949  10/1921  France ............................... 308/201

*Primary Examiner*—Charles J. Myhre
*Assistant Examiner*—Frank Susko
*Attorney, Agent, or Firm*—Sandoe, Hopgood and Calimafde

[57] ABSTRACT

An antrifriction ball bearing includes a segmented retaining ring formed by first and second pluralities of metal stampings, each plurality being arranged end-to-end in a circle. The antifriction elements are retained in truncated spherical cavities, formed between angularly registered concaved surfaces of the stampings. Angularly registered flat surfaces disposed between the concaved surfaces are joined to each other by spot welds or rivets. This construction, particularly when applied to large diameter bearings, lends itself to simplified production of the retaining ring with significantly more efficient use of materials than was possible previously.

5 Claims, 6 Drawing Figures

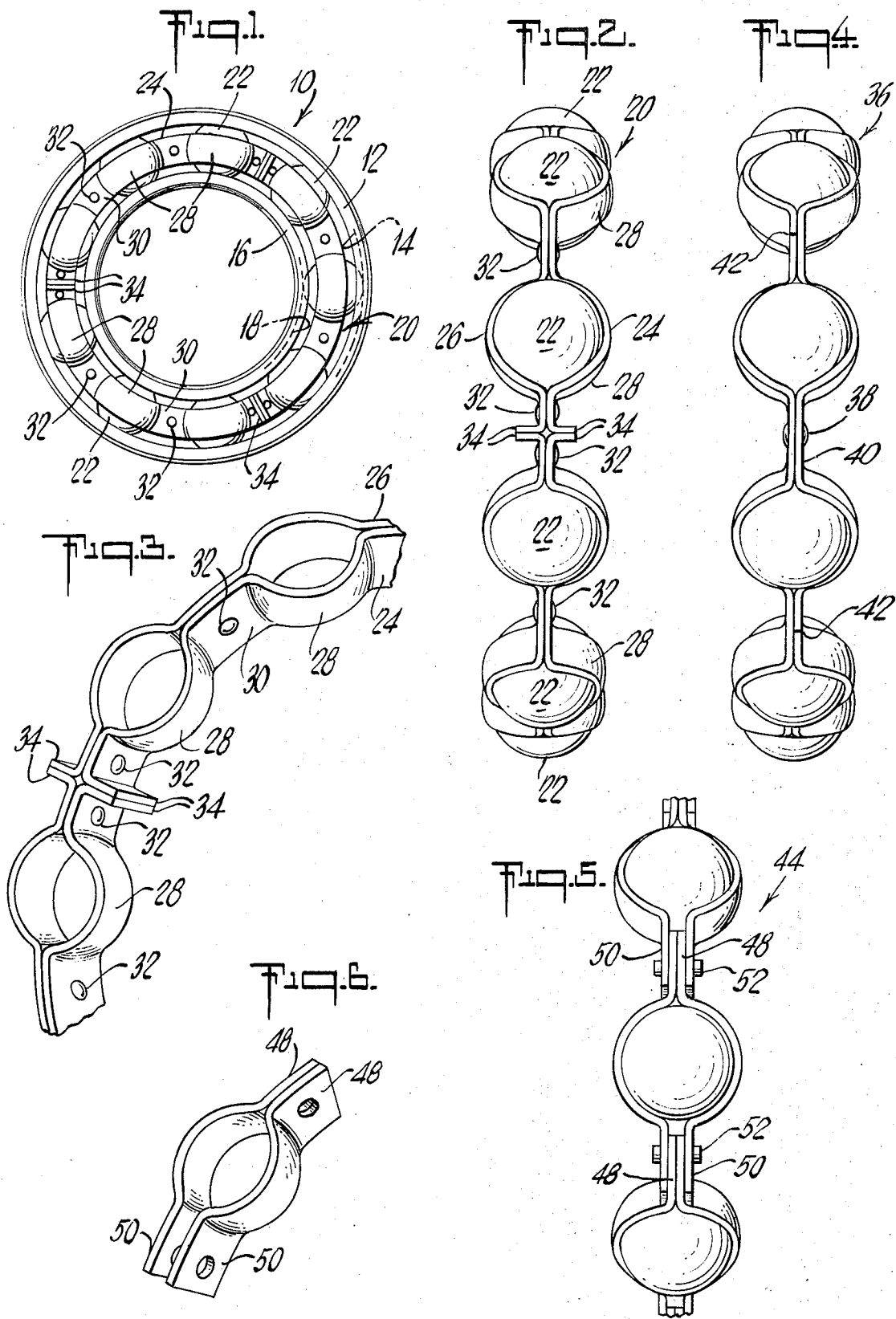

SEGMENTED RETAINING RINGS FOR ANTIFRICTION BALL BEARINGS

This invention relates to an improved ball bearing construction and more particularly to a segmented retaining ring for use in such bearings.

It is an object of this invention to provide a construction of the type indicated which lends itself to mass production techniques.

It is a further object to provide a retaining ring for ball bearings which more efficiently utilizes the material of its construction. Another object is to provide a retaining ring which utilizes a plurality of alike easily fabricated parts. Still another object is to form a retaining ring, particularly a large diameter retaining ring, without forming each half of the ring as a single piece.

It is a general object of thhe invention to provide a ball bearing and retaining ring which, while meeting each of the above objectives, is easily assembled and lends itself to extreme economies of manufacture.

It is a specific object of the present invention to provide a segmented retaining ring construction for incorporation in a ball bearing in which first and second pluralities of metal stampings are arranged end-to-end so that each plurality forms a circle. The stampings include concaved antifriction element engaging surfaces, those of the first plurality being in angular registration with those of the second to form cavities therebetween in which spherical antifriction elements are held.

Other objects and various further features of novelty and invention will be pointed out or will occur to those skilled in the art from a reading of the following description in conjunction with the accompanying drawings. In said drawings which show, for illustrative purposes only, preferred forms of the invention:

FIG. 1 is an orthogonal side view of a ball bearing constructed in accordance with the present invention;

FIG. 2 is an orthogonal top elevation of the retaining ring of the bearing of FIG. 1;

FIG. 3 is a fragmentary pictorial view of the retaining ring of FIG. 2;

FIG. 4 is an orthogonal top elevation of a variation of the retaining ring shown in FIGS. 2 and 3;

FIG. 5 is a fragmented orthogonal top elevation of another variation of the retaining ring shown in FIG. 2;

FIG. 6 is a fragmented pictorial view of the retaining ring shown in FIG. 5.

Briefly stated, the present invention contemplates a segmented retaining ring including first and second pluralities of metal segments, each plurality being arranged in end-to-end relation, forming a circle. Spherical antifriction elements of a ball bearing are retained in predetermined spaced apart relation between angularly registered concaved surfaces formed by opposing segments.

As shown in FIG. 1, a ball bearing 10 includes an outer ring 12 having a raceway 14 on its radially inner surface, and a radially inner ring 16 having a raceway 18 on its radially outer surface. Located between the inner and outer rings 12 and 16 is a segmented retaining ring 20. A plurality of spherical antifriction elements 22 ride the raceways 14 and 18 while maintained in spaced-apart relation by the retaining 20.

Visible in FIG. 1 is a first plurality of arcuate segments 24, each of which is a metal stamping, that are arranged end-to-end in a circle to form one side of the retaining ring 20. A second plurality of segments 26 are similarly arranged in end-to-end fashion to form the opposing side of the ring 20, as may be seen in FIGS. 2 and 3.

Each segment 24, 26 includes a number of axially facing concaved surfaces 28, those of the first segments 24 being in angular registration with and facing those of the second segments 26. Spherical antifriction elements 22 are thus engaged in cavities between opposing concaved surfaces in fixed relative positions. The antifriction element engaging cavities take the shape of a sphere truncated at two opposite poles.

The segments 24, 26 include interstitial flat surfaces 30 disposed between the curved surfaces 28. In the embodiment of FIGS. 1-3, the segments 24, 26 of the first and second pluralities are joined together by spot welds or rivets 32 along their flat surfaces 30 to form a series of unitary structures. Each such unitary structure abuts against but is not joined to the angularly next adjacent structure. The ends portion 34 of each stamping 24, 26 are bent outwardly at right angles to the adjacent flat surfaces to present an abuting surface for positive flush engagement with the similar end portion of the angularly next stamping.

A variation 36 of the retaining ring 20 of FIGS. 2 and 3 is shown in FIG. 4 in which the stamping 24 of the first plurality are not in angular registration with those (26) of the second plurality. Therefore, the rivets or welds 38 which attach angularly registered interstitial flat surfaces 40 of the first and second stampings respectively serve to join the segments of the entire ring into a single unitary structure as distinguished from the plurality of abuting but separate unitary structures shown in FIG. 1. In this embodiment, the outwardly bent portions 34 may be omitted from the angularly spaced ends 42 of the individual stampings. Spaced ends 42 may be welded to facing flat surface 40.

As in the case of FIGS. 1–3, the ring 36 of FIG. 4 is constructed of a multiplicity of alike parts that are easily manufactured with a minimum of scrap material being generated thereby.

FIGS. 5 and 6 show another variation 44 of the retaining ring of this invention in which corresponding stampings 46 of the first and second pluralities are arranged in angularly registered pairs, each pair having two mutually engaging flat surfaces 48 at one end, and two spaced-apart flat surfaces 50 at the opposite end. Successive pairs of stampings are interlocked with the mutually engaging surfaces 48 of each inserted between the spaced-apart surfaces 50 of the next pair and held in that position by pins 52.

Each pair of segments of the ring 44 includes only one pair of antifriction-element-cavity defining curved surfaces 54 and thus retains only a single spherical antifriction element 56. Therefore, the stampings need not take an arcuate shape, and any number of pairs may be interlocked to provide a retaining ring 44 of the diameter desired. In the case of arcuate segments, it is possible to use the same stampings to form rings of slightly different diameters using balls of the same diameter. This can be accomplished by bending the stamping after it has been formed.

Having thus described our invention, we claim:

1. A retaining ring for a ball bearing comprising a first plurality of metal segments arranged end-to-end in a circle, each segment including at least one axially facing concaved antifriction element engaging surface, and a second plurality of similar metal segments also arranged end-to-end in a circle, each segment of the second plurality including at least one axially facing antifriction element engaging surface which is in angular registration with an oppositely facing concaved surface of the first plurality to retain a spherical antifriction element in the cavity formed between each pair of opposing concaved surfaces, the segments of said first plurality being angularly offset with respect to and overlapping those of said second plurality, to at least the extent that each pair of opposed concaved surfaces may engage a single antifriction element and that each antifriction element will simultaneously engage angularly offset parts of adjacent segments of said first and second pluralities.

2. The retaining ring of claim 1, wherein each pair of angularly opposed registered concaved surfaces defines an antifriction element retaining cavity in the shape of a sphere truncated at two opposite poles.

3. A segmented retaining ring for a ball bearing comprising a plurality of first arcuate metal stampings arranged end-to-end in a circle, said first plurality of stampings including concaved antifriction element-engaging surfaces and a plurality interstitial flat surfaces therebetween, a plurality of second arcuate metal stampings similar to the stampings of the first plurality arranged end-to-end in a circle with the concaved surfaces of the second stampings facing and in angular registration with those of the first plurality whereby a spherical antifriction element is retained in a fixed relative angular position between each pair of angularly registered concaved surfaces, said flat surfaces of the first stampings being attached to flat surfaces of the second stampings, and the ends of the first stampings being angularly displaced from the ends of the second stampings.

4. The retaining ring of claim 3, wherein said flat surfaces of the first stampings are attached to flat surfaces of the second stampings and the ends of the first stampings are angularly displaced from the ends of the second stampings.

5. An antifriction ball bearing comprising inner and outer rings having radially opposed raceways, a plurality of spherical antifriction elements riding said raceways, and a segmented retaining ring disposed radially between the inner and outer rings including first and second pluralities of arcuate metal stampings each plurality arranged end-to-end in a circle, each stamping including a plurality of concaved antifriction element engaging surfaces, the concaved surfaces of the first plurality being opposed to and in angular registration with those of the second, the ends of the stampings of said first plurality being angularly displaced from the ends of the stampings of the second plurality, whereby the antifriction elements are maintained in predetermined spaced relation while held within cavities formed between angularly registered concaved surfaces of angularly offset and overlapping stampings of the respective pluralities.

* * * * *